US010012282B2

(12) United States Patent
Kimura et al.

(10) Patent No.: US 10,012,282 B2
(45) Date of Patent: Jul. 3, 2018

(54) SHOCK ABSORBER

(71) Applicant: HITACHI AUTOMOTIVE SYSTEMS, LTD., Ibaraki (JP)

(72) Inventors: Yusei Kimura, Yokohama (JP); Yohei Katayama, Yokohama (JP); Naofumi Harada, Kawasaki (JP); Satoshi Shimazaki, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 5 days.

(21) Appl. No.: 14/661,576

(22) Filed: Mar. 18, 2015

(65) Prior Publication Data
US 2015/0276000 A1     Oct. 1, 2015

(30) Foreign Application Priority Data

Mar. 31, 2014   (JP) ................. 2014-074246

(51) Int. Cl.
| | |
|---|---|
| *F16F 9/34* | (2006.01) |
| *F16F 9/18* | (2006.01) |
| *F16F 9/32* | (2006.01) |
| *F16F 9/46* | (2006.01) |

(52) U.S. Cl.
CPC ............. *F16F 9/34* (2013.01); *F16F 9/185* (2013.01); *F16F 9/3257* (2013.01); *F16F 9/46* (2013.01)

(58) Field of Classification Search
CPC ........ F16F 9/18; F16F 9/32; F16F 9/34; F16F 9/46; F16F 9/48; F16F 9/185; F16F 9/325; F16F 9/465; F16F 2226/04; B60G 2202/24; B60G 2206/41; B60G 2500/10; B60G 13/08

USPC ........................................................ 188/315
See application file for complete search history.

(56) References Cited

U.S. PATENT DOCUMENTS

| | | | | |
|---|---|---|---|---|
| 5,788,030 | A | * | 8/1998 | Rottenberger ............ F16F 9/34 188/290 |
| 5,934,421 | A | * | 8/1999 | Nakadate ................ F16F 9/325 188/299.1 |
| 8,469,162 | B2 | * | 6/2013 | Nishimura ............. B60G 13/06 137/315.03 |

(Continued)

FOREIGN PATENT DOCUMENTS

JP     2012-72857     4/2012

*Primary Examiner* — Robert A. Siconolfi
*Assistant Examiner* — San Aung
(74) *Attorney, Agent, or Firm* — Wenderoth, Lind & Ponack, L.L.P.

(57) ABSTRACT

A flow of hydraulic oil induced by sliding movement of a piston in a cylinder is controlled by a damping force generating mechanism to generate a damping force. A flow of hydraulic oil from a casing of the damping force generating mechanism toward a reservoir is regulated by a passage groove formed on the bottom of the casing so as to be directed downward in the reservoir. Thus, the hydraulic oil is efficiently supplied to a base valve from the damping force generating mechanism even when the hydraulic oil is sucked from the reservoir into a cylinder lower chamber through a passage in the base valve during the extension stroke of a piston rod. Therefore, it is possible to suppress a sharp reduction in pressure in the lower part of the reservoir and hence possible to suppress the occurrence of aeration and to obtain stable damping force characteristics.

14 Claims, 6 Drawing Sheets

(56) References Cited

U.S. PATENT DOCUMENTS

| | | | |
|---|---|---|---|
| 2012/0073918 A1* | 3/2012 | Nishimura | B60G 13/06 188/266.2 |
| 2012/0073920 A1* | 3/2012 | Yamasaki | B60G 17/08 188/315 |
| 2013/0341140 A1* | 12/2013 | Nakajima | F16F 9/325 188/315 |

* cited by examiner

SHOCK ABSORBER

BACKGROUND OF THE INVENTION

The present invention relates to shock absorbers that generate a damping force by controlling a flow of hydraulic fluid in response to a stroke of a piston rod.

Tube-type shock absorbers attached to suspension systems of vehicles, for example, automobiles, are generally arranged as follows. A piston with a piston rod connected thereto is inserted in a cylinder having a hydraulic oil sealed therein as a hydraulic fluid. A stroke of the piston rod causes sliding movement of the piston in the cylinder, which in turn induces a flow of hydraulic oil. The hydraulic oil flow is coat roiled by a damping force generating mechanism, which comprises an orifice, a disk valve, etc., to generate a damping force. Shock absorbers of this type include one in which a reservoir having a hydraulic oil and a gas sealed therein is connected to the cylinder to compensate for a cubic capacity change in the cylinder caused by the entry and exiting of the piston rod into and from the cylinder and a volumetric change of the hydraulic oil due to a temperature change. More specifically, such a cubic capacity change and a volumetric change are compensated for by the compression and expansion of the gas in the reservoir.

In a shock absorber having a reservoir as stated above, if the gas in the reservoir gets mixed into the hydraulic oil as bubbles or dissolves in the hydraulic oil, aeration or cavitation may occur, causing the damping force to become unstable. Under these circumstances, Japanese Patent Application Laid-Open Publication No. 2012-72857 discloses a shock absorber having a baffle plate disposed in the reservoir. With this structure, an inlet port through which the hydraulic oil flows into the reservoir from the damping force generating mechanism can be isolated from the oil surface in the reservoir, and it is possible to gradually enlarge the flow path area of hydraulic oil flowing into the reservoir from the damping force generating mechanism. Accordingly, it is possible to suppress the gas in the reservoir from getting mixed into the hydraulic oil as bubbles or from dissolving in the hydraulic oil and hence possible to suppress the occurrence of cavitation and aeration.

However, there is a demand that the occurrence of aeration and cavitation be suppressed without providing a baffle plate in the reservoir as in the shock absorber disclosed in Japanese Patent Application Laid-Open Publication No. 2012-72857, thereby increasing productivity.

SUMMARY OF INVENTION

An object of the present invention is to provide a shock absorber capable or suppressing the occurrence of aeration and cavitation without providing a baffle plate in the reservoir and hence exhibiting superior productivity.

To solve the above-described problem, the present invention provides a shock absorber including a cylinder having a hydraulic fluid sealed therein, a piston disposed or inserted in the cylinder, a piston rod connected to one piston and extended to the outside of the cylinder, an outer tube provided around the outer periphery of the cylinder, a reservoir formed between the cylinder and the outer tube and having the hydraulic fluid and a gas sealed therein, a separator tube provided between the cylinder and the outer tube to form a passage between the separator tube and the cylinder, which passage communicates with the interior of the cylinder, a separator tube opening formed in a side wall of the separator tube, an opening provided in a side wall of the outer tube to face the separator tube opening, a casing secured to the side wall of the outer tube such that the interior of the casing communicates with the reservoir through the opening, a damping force generating mechanism housed in the casing and connected to the separator tube opening to generate a damping force by controlling a flow of the hydraulic fluid, and a regulating part provided in the casing to restrict the occurrence of a circumferential flow of hydraulic fluid at a point of intersection between the direction of a flow of hydraulic fluid flowing from the interior of the casing toward the reservoir and the axial direction of the reservoir.

DESCRIPTION OF EMBODIMENTS

Figure 2:
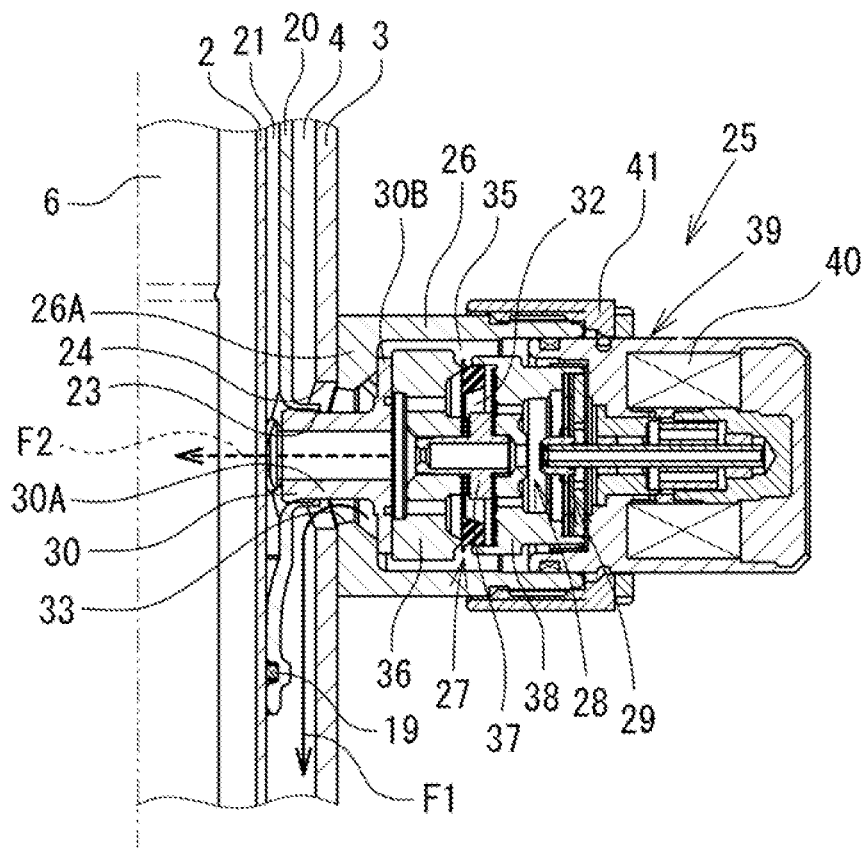
FIG. 2 is an enlarged vertical sectional view of a damping force generating mechanism of the shock absorber shown in FIG. 1.
Figure 3:
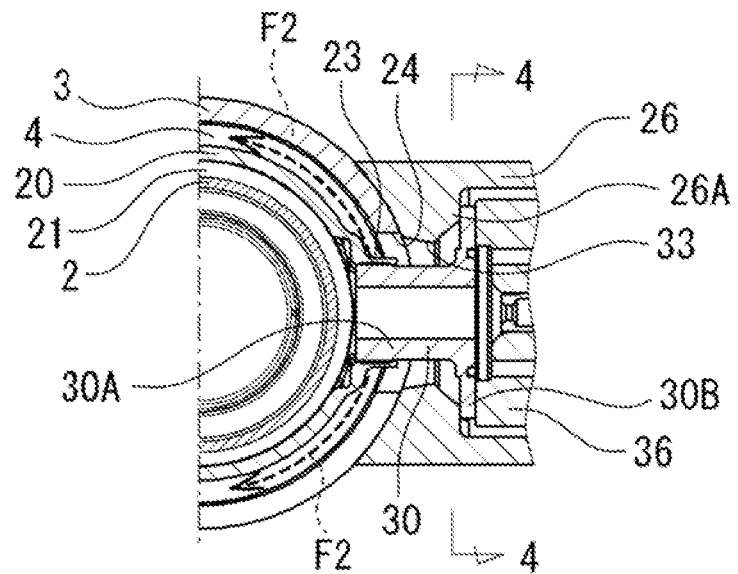
FIG. 3 is a fragmentary cross-sectional view of an important part of the damping force generating mechanism shown in FIG. 2.
Figure 4:
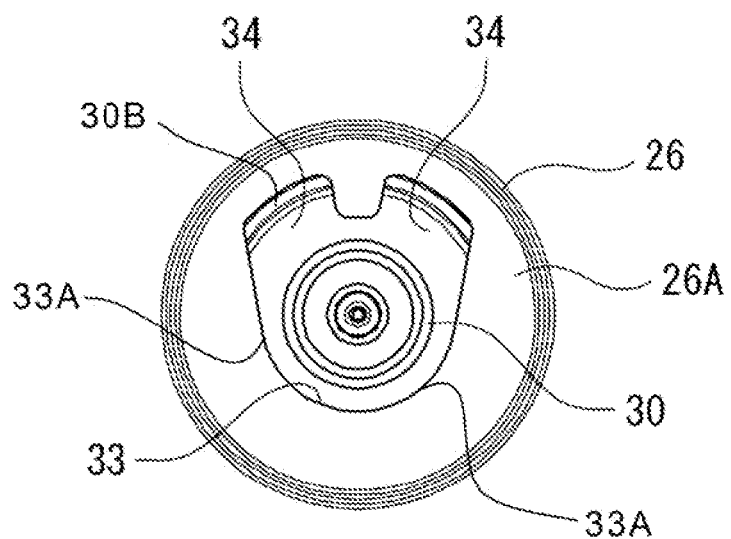
FIG. 4 is a sectional view taken along the line 4-4 in FIG. 3.

A first embodiment of the present invention will be explained blow with reference to FIGS. 1 to 3.

Figure 1:
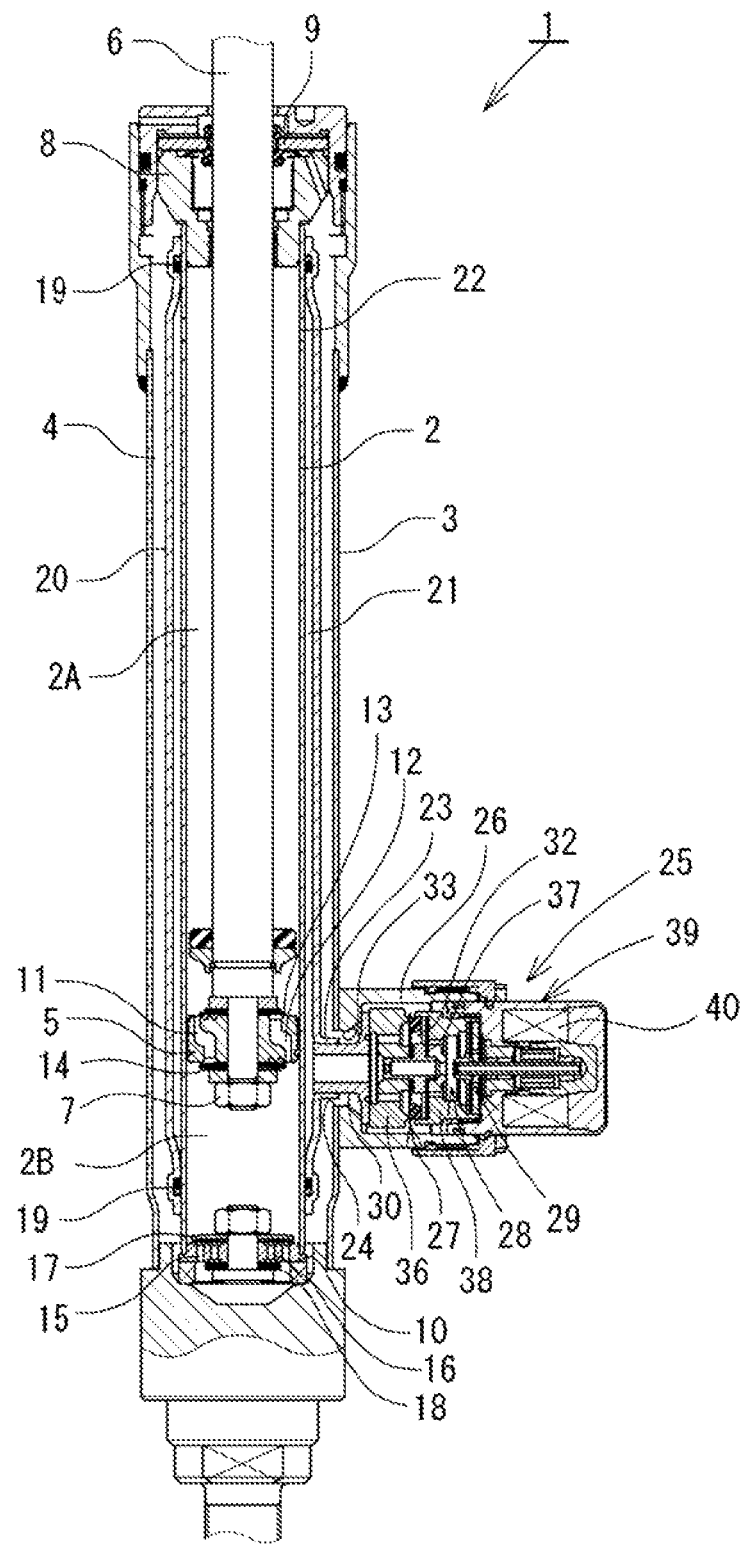
FIG. 1 is a vertical sectional view of a shock absorber according to a first embodiment of the present invention.

As shown in FIG. 1, a shock absorber 1 according to this embodiment is a tube-type damping force control hydraulic shock absorber. The shock absorber 1 has a double-tube structure comprising a cylinder 2 and an outer tube 3 provided around the outer periphery of the cylinder 2. Between the cylinder 2 and the outer tube 3, an annular reservoir 4 is formed. The cylinder 2 has a piston 5 slidably fitted therein. The piston 5 divides the interior of the cylinder 2 into two chambers, i.e. a cylinder upper chamber 2A and a cylinder lower chamber 2B. The piston 5 has one end of a piston rod 6 connected thereto by a nut 7. The other end of the piston rod 6 extends through the cylinder upper chamber 2A and through a rod guide 8 and an oil seal 9, which are provided in the upper end of the double-tube structure comprising the cylinder 2 and the outer tube 3. The other end of the piston rod 6 extends to the outside of the cylinder 2. In the lower end of the cylinder 2, a base valve 10 is provided to divide the cylinder lower chamber 2B and the reservoir 4 from each other.

The piston 5 is provided with passages 11 and 12 communicating between the cylinder upper and lower chambers 2A and 2B. The passage 12 is provided with a check valve 13 allowing only the flow of fluid from the cylinder lower chamber 2B toward the cylinder upper chamber 2A. The passage 11 is provided with a disk valve 14 that opens when the fluid pressure in the cylinder upper chamber 2A reaches a predetermined pressure to relieve the pressure to the cylinder lower chamber 2B.

The base valve 10 is provided with passages 15 and 16 communicating between the cylinder lower chamber 2B and the reservoir 4. The passage 15 is provided with a check valve 17 allowing only the flow of fluid from the reservoir 4 toward the cylinder lower chamber 2B. The passage 16 is provided with a disk valve 18 that opens when the fluid pressure in the cylinder lower chamber 2B reaches a predetermined pressure to relive the pressure to the reservoir 4. The cylinder 2 has a hydraulic oil, which is a hydraulic liquid, sealed therein as a hydraulic fluid, and the reservoir 4 has the hydraulic oil and a gas sealed therein.

The cylinder 2 has a separator tubs 20 fitted thereover with seal members 19 interposed therebetween at the upper and lower ends of the cylinder 2. An annular passage 21 is formed between a side wall of the cylinder 2 and a circular cylindrical side wall of the separator tube 20 provided around the outer periphery of the side wall of the cylinder 2. The annular passage 21 is communicated with the cylinder upper chamber 2A through a passage 22 provided in the side wall of the cylinder 2 near the upper end thereof. The separator tube 20 has a branch pipe 23 projecting from a lower part of the side wall thereof to serve as a separator tube opening. The branch pipe 23 is in the shape of a substantially circular cylinder of small diameter having an opening communicating with the annular passage 21. The side wall of the outer tube 3 is provided with an opening 24 facing the branch pipe 23. The opening 24 has a larger diameter than the branch pipe 23 and is disposed in concentric relation to the branch pipe 23. A damping force generating mechanism 25 is secured to the side wall of the outer tube 3 to face both the branch pipe 23 and the opening 24. It should be noted that the separator tube opening is not limited to comprising a branch pipe projecting radially outward from the separator tubs 20 and communicated with the annular passage 21, but may comprise only an opening formed in the side wall of the separator tube 20 so as to communicate with the annular passage 21.

The damping force generating mechanism 25 has a substantially circular cylindrical casing 26 secured to the side wall of the outer tube 3 in such a manner as to cover the opening 24 of the outer tube 3. The casing 26 is provided therein with a pilot-type (back-pressure type) main valve 27 and a pilot valve 28 which is a solenoid-driven pressure control valve controlling the valve-opening pressure of the main valve 27. Further, a fail-safe valve 29 is provided downstream of the pilot valve 28. The fail-safe valve 29 operates when there is a failure. The main valve 27, the pilot valve 28, and the fail-safe valve 29 constitute in combination a damping valve. The branch pipe 23 has a passage member 30 connected thereto. The hydraulic oil introduced into the damping force generating mechanism 25 from the branch pipe 23 through the passage member 30 flows into a chamber 35 in the casing 26 through the main valve 27, the pilot valve 28, and the fail-safe valve 29. The hydraulic oil in the chamber 35 flows into the reservoir 4 through an opening 33 in a bottom 26A of the casing 26 and through the opening 24 of the outer tube 3.

Figure 5:
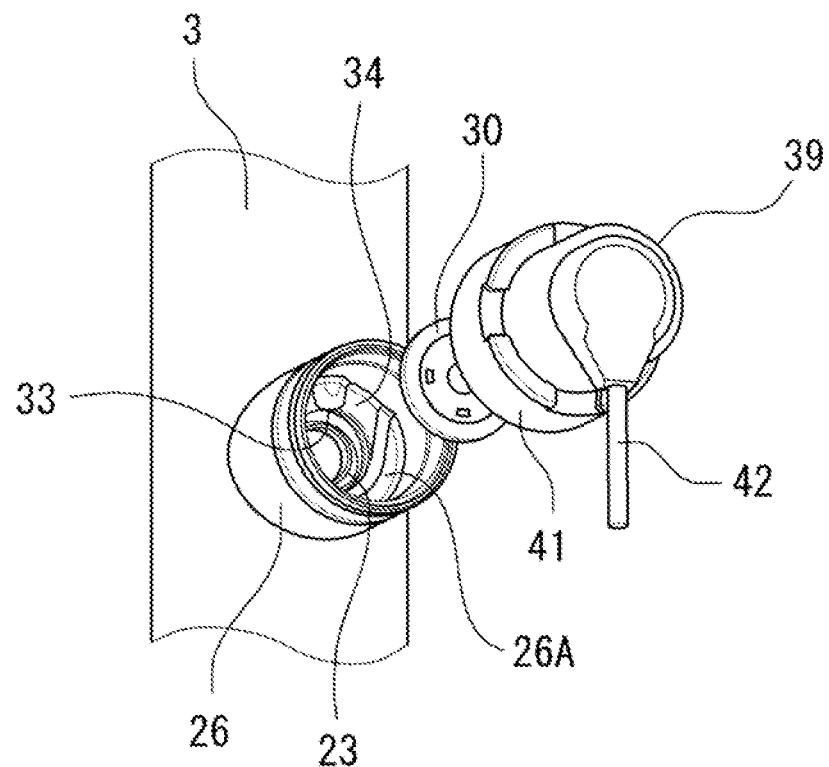
FIG. 5 is an exploded perspective view of the damping force generating mechanism shown in FIG. 2.

Before the main valve 27 opens, the pilot valve 28 controls the flow of hydraulic oil to generate a damping force. When the main valve 27 is open, damping force is generated mainly by the main valve 27. In addition, a part of hydraulic oil at the upstream side of the pilot valve 28 is introduced into a back pressure chamber 32 at the rear of the main valve 27, and the pressure in the back pressure chamber 32 is applied to the main valve 27 in the direction for closing the main valve 27. The damping force can be controlled by adjusting the control pressure of the pilot valve 28 with an electric current supplied to a coil 40 of a solenoid through a lead wire 42 (see FIG. 5), and this causes a change in pressure in the back pressure chamber 32, thereby making it possible to control both the valve-opening pressure and the degree of opening of the main valve 27. The fail-safe valve 29 closes when the supply of electric current to the coil 40 is cut off. Thus, the fail-safe valve 29 restricts the flow of hydraulic oil in place of the pilot valve 28, which is now open at all times, thereby preventing an excessive reduction of damping force and maintaining an appropriate damping force.

As shown in FIGS. 2 to 5, the casing 26 is formed in the shape of a circular cylinder with a bottom 26A. The bottom 26A has an opening 33 larger in diameter than the branch pipe 23 of the separator tube 20 and connected to the opening 24 of the outer tube 3. In addition, the bottom 26A has a passage groove 34 of a substantially V-shape in front view (see FIGS. 4 and 5) formed on the inner side thereof. The passage groove 34 extends from near the inner peripheral surface at the upper side of the casing 26 (i.e. the upper side of the casing 26 as seen in use of the shock absorber 1 shown in FIGS. 1 and 2; the same shall apply hereinafter) to the opening 33. The passage groove 34 is formed in such a V-shape that the passage groove 34 is forked at an upper end thereof and tapers toward a lower end thereof at which the passage groove 34 communicates with the opening 33. The outer side of the bottom 26A of the casing 26 is curved along the outer peripheral surface of the outer tube 3 and secured to the outer tube 3 by a securing method, e.g. welding.

The casing 26 receives, in order from the bottom side thereof, the passage member 30, a main body 36 in which the main valve 27 is provided, a pilot pin 37 forming a pilot passage, and a pilot body 33 in which the pilot valve 28 is provided. A solenoid assembly 39 for driving the pilot valve 28 is thread-connected to the opening of the casing 26 by a nut 41, thereby securing the main body 36, the pilot pin 37, and the pilot body 38 to each other.

The passage member 30 has a circular cylindrical portion 30A and a flange portion 30B formed on the outer periphery at one end of the cylindrical portion 30A. The cylindrical portion 30A is liquid-tightly fitted into the branch pipe 23 of the separator tube 20. The flange portion 30B is clamped between the bottom 26A of the casing 26 and the main body 36, thereby the passage member 30 being secured. The annular passage 21 is connected to the main valve 27, the pilot valve 28, and the fail-safe valve 29 through a passage in the cylindrical portion 30A of the passage member 30. The passage groove 34, which is provided on the bottom 26A of the casing 26, extends radially outward of the casing 26 beyond the flange portion 30B of the passage member 30 (see FIG. 4) to communicate with the chamber 35. The chamber 35 is formed around the main body 36 and the pilot body 38 in the casing 26. The chamber 35 is connected to the reservoir 4 through the passage groove 34, the opening 33 in the bottom 26A of the casing 26, and the opening 24 in the outer tube 3. The passage groove 34 cooperates with the side wall surface 33A of the opening 33 to form a regulating part that restricts the occurrence of a circumferential flow of hydraulic oil at a point of intersection between the direction of a flow of hydraulic oil flowing from the chamber 35 toward the reservoir 4 and the axial direction of the reservoir 4. This will be explained below by using FIGS. 2 and 3. The solid-line arrow shown in FIG. 2 represents an actual flow of hydraulic oil, and the chain-line arrows shown in FIGS. 2 and 3 represent unreal flows of hydraulic oil, which occur when there is no regulating part. In FIG. 2, the side wall surface 33A of the opening 33 regulates (blocks) a flow (F2) of hydraulic oil flowing toward the circumferential direction of the separator tube 20 at a point of intersection between the direction of a flow of hydraulic oil flowing from the chamber 35 toward the reservoir 4 and the axial direction of the reservoir 4. Thus, the hydraulic oil can be rectified into a flow (F1) directed mainly downward.

The following is an explanation of the operation of this embodiment arranged as stated above.

The shock absorber 1 is installed between two members movable relative to each other, e.g. a sprang member (vehicle body-side member) and an unsprung member (wheel-side member) of a suspension system of a vehicle, with the piston rod 6 side facing up, and the base valve 10 side facing down. The coil 40 of the solenoid assembly 39 is connected to a controller.

During the extension stroke of the piston rod 6, the movement of the piston 5 in the cylinder 2 closes the check valve 13 of the piston 5. Before the disk valve 14 opens, the fluid in the cylinder upper chamber 2A is pressurized to flow through the passage 22 and the annular passage 21 into the passage member 30 of the damping force generating mechanism 25 from the branch pipe 23 of the separator tube 20. The fluid flowing from the passage member 30 passes through the main valve 27, the pilot valve 28, and the fail-safe valve 29 to flow into the chamber 35 surrounded by the casing 26 and further passes through the passage groove 34 at the end of the casing 26 and through the opening 24 of the outer tube 3 to flow into the reservoir 4.

At this time, an amount of fluid corresponding to the amount of movement of the piston 5 flows into the cylinder lower chamber 2B from the reservoir 4 by opening the check valve 17 of the base valve 10. It should be noted that when the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive rise in pressure in the cylinder upper chamber 2A.

During the compression stroke of the piston rod 6, the movement of the piston 5 in the cylinder 2 opens the check valve 13 of the piston 5 and closes the check valve 17 for the passage 15 of the base valve 10. Before the disk valve 18 opens, the fluid in the cylinder lower chamber 2B flows into the cylinder upper chamber 2A, and an amount of fluid corresponding to the amount by which the piston rod 6 enters the cylinder 2 flows from the cylinder upper chamber 2A into the reservoir 4 through a flow path similar to that during the above-described extension stroke. It should be noted that when the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive rise in pressure in the cylinder lower chamber 2B.

Thus, during both the extension and compression strokes of the piston rod 6, before the main valve 27 opens (in a low piston speed region) in the damping force generating mechanism 25, the pilot valve 28 generates a damping force. After the main valve 27 has opened (in a high piston speed region), the main valve 27 generates a damping force according to the degree of opening thereof. The damping force can be controlled by adjusting the control pressure of the pilot valve 28 with an electric current supplied to the solenoid 40, and this causes a change in pressure in the back pressure chamber 32, thereby making it possible to control both the valve-opening pressure and the degree of opening of the main valve 27. When the supply of electric current to the coil 40 is cut off due to stopping of the vehicle because, for example, of signal waiting, or due to an unexpected failure, the fail-safe valve 29 closes to restrict the flow of hydraulic oil in place of the pilot valve 28, which is now open at all times, thereby preventing an excessive reduction of damping force and maintaining an appropriate damping force.

The passage groove 34, which communicates between the chamber 35 in the casing 26 and the reservoir 4, extends from the upper side of the casing 26 toward the opening 33 in the bottom 26A of the casing 26. Therefore, the hydraulic oil flowing from the chamber 35 toward the reservoir 4 is rectified along the passage groove 34, and the occurrence of a flow of hydraulic oil toward the upper side of the reservoir 4 is restricted by the opening 33. In addition, the occurrence of a circumferential flow of hydraulic oil is restricted by the side wall surface 33A. Accordingly, the flow of hydraulic oil is directed mainly downward. In this way, the hydraulic oil flows into the reservoir 4 through the opening 33 in the bottom 26A and through the opening 24 in the outer tube 3. That is, the occurrence of a circumferential flow (F2) of hydraulic oil at a point of intersection between the direction of a flow of hydraulic oil flowing from the chamber 35 toward the reservoir 4 and the axial direction of the reservoir 4 is restricted, and the hydraulic oil is converged into an axial flow (F1).

Consequently, even when the hydraulic oil is sucked into the cylinder lower chamber 2B from the reservoir 4 through the passage 15 in the base valve 10 daring the extension stroke of the piston rod 6, the hydraulic oil is supplied from the damping force generating mechanism 25 downwardly toward the base valve 10 efficiently, i.e. convergently. Therefore, even when the surface of hydraulic oil in the reservoir 4 lowers, a gas phase is unlikely to occur between the hydraulic oil flowing into the reservoir 4 from the chamber 35 and the surface of hydraulic oil in the reservoir 4. In addition, the turbulence of the hydraulic oil surface in the reservoir 4 is suppressed. As a result, mixing of the gas and liquid in the reservoir 4 is suppressed, so that it is possible to suppress she occurrence of aeration and cavitation (although aeration and cavitation occur, it is possible to reduce the amount of gas sucked into the cylinder lower chamber 2B from the base valve 10), and hence possible to obtain stable damping force characteristics. Because it is unnecessary to provide a baffle plate in the reservoir 4, there is no increase in parts cost or in the number of man-hours for assembling, which would otherwise be caused by addition of a baffle plate, and no assembling failure occurs.

It should be noted that, when the passage groove 34 is not provided, the hydraulic oil flowing from the chamber 35 in the casing 26 into the reservoir 4 through the opening 33 in the bottom 26A of the casing 26 and through the opening 24 in the outer tube 3 flows along the circumferential direction of the separator tube 20 and the outer tube 3 (i.e. the downward flow is lower in speed than in the structure in which the passage groove 34 is provided), and a gas phase may occur between the circumferential flow of hydraulic oil and the surface of hydraulic oil in the reservoir 4 during the extension stroke. The gas phase is likely to cause aeration and hence cause damping force characteristics to become unstable.

In the embodiment of the present invention, the passage groove 34 restricts the occurrence of a circumferential flow of hydraulic oil at a point of intersection between the direction of a flow of hydraulic oil flowing from the chamber 35 toward the reservoir 4 and the axial direction of the reservoir 4 and positively rectifies the flow of hydraulic oil downward in the reservoir 4. Accordingly, the occurrence of a gas phase can be suppressed.

Next, other embodiments of the present invention will be explained.

In the following explanation, members or portions similar to those of the foregoing first embodiment are denoted by the came reference numerals as those used in the first embodiment, and only the points in which each of other embodiments differs from the first embodiment will be explained in detail.

A shock absorber according to a second embodiment of the present invention will be explained below with reference to FIGS. 6 and 7.

Figure 6:
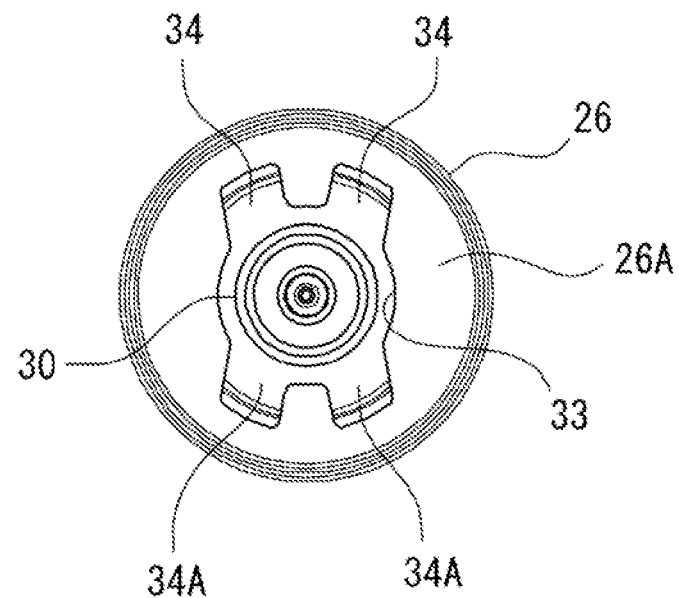
FIG. 6 is a sectional view similar to FIG. 3, showing a damping force generating mechanism of a shock absorber according to a second embodiment of the present invention.
Figure 7:
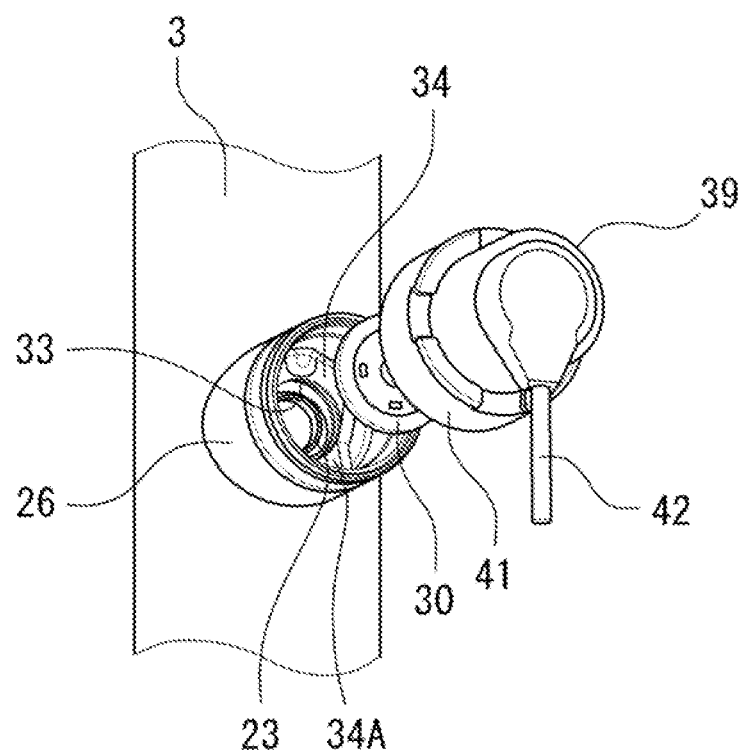
FIG. 7 is an exploded perspective view of the damping force generating mechanism of the shock absorber according to the second embodiment of the present invention.

As shown in FIGS. 6 and 7, the shook absorber according to the second embodiment has a passage groove 34A formed on the bottom 26A of the casing 26 in addition to the passage groove 34. The passage groove 34A has a substantially inverted V-shape in front view (see FIGS. 6 and 7) and extends from near the inner peripheral surface at the lower side of the casing 26 to the opening 33. The passage groove 34A is formed in such an inverted V-shape that the passage groove 34A is forked at a lower end thereof and tapers toward an upper end thereof at which the passage groove 34A communicates with the opening 33. Consequently, the bottom 26A of the casing 26 has a substantially X-shaped groove formed from the passage groove 34 and the passage groove 34A in combination.

With the above-described structure, the hydraulic oil flowing from the chamber 35 in the casing 26 toward the reservoir 4 is rectified along the passage groove 34 and the passage groove 34A and directed downward and upward. That is, the flow of hydraulic oil flowing out of the chamber 35 in the casing 26 is directed downward and upward by the passage groove 34 and the passage groove 34A, which are provided between the chamber 35 in the casing 26 and the reservoir 4. Thus, some hydraulic oil flows upward in the second embodiment as compared to a related technique of blocking an upward flow of hydraulic oil in the reservoir 4 when the hydraulic oil flows thereinto from the chamber 35 in the casing 26. The hydraulic oil directed by the passage grooves 34 and 34A flows into the reservoir 4 through the opening 33 in the bottom 26A and through the opening 24 in the outer tube 3. Consequently, even when the hydraulic oil is sucked into the cylinder lower chamber 2B from the reservoir 4 through the passage 15 in the base valve 10 during the extension stroke of the piston rod 6, it is possible to restrict the occurrence of a circumferential flow (F2) of hydraulic oil at a point of intersection between the direction of a flow of hydraulic oil flowing from the damping force generating mechanism 25 toward the reservoir 4 and the axial direction of the reservoir 4. That is, a flow (F1) of hydraulic oil flowing in the axial direction of the reservoir 4 is allowed, and the occurrence of a circumferential flow (F2) of hydraulic oil is restricted. In this way, the hydraulic oil is rectified downward by the passage groove 34, and the downwardly rectified hydraulic oil (F1) is supplied to the base valve 10. Therefore, a sharp reduction in pressure in the lower part of the reservoir 4 is suppressed, and the turbulence of the surface of hydraulic oil in the reservoir 4 is suppressed. On the other hand, the hydraulic oil rectified upward by the passage groove 34A affects the hydraulic oil surface in the reservoir 4. However, the rectifying effect of the passage grooves 34 and 34A allows suppression of the occurrence of a gas phase due to a circumferential flow of hydraulic oil as experienced with the above-described structure in which no passage groove is provided. Therefore, it is possible to suppress the occurrence of aeration and cavitation and to obtain stable damping force characteristics although the second embodiment is somewhat inferior in effectiveness to the foregoing first embodiment. According no the second embodiment, the casing 26 can be installed to the outer tube 3 without distinction between the upper and lower sides of the casing 26; therefore, it is possible to reduce the possibility that an operator on duty will mistake the installation direction. Accordingly, productivity can be further increased.

Next, a shock absorber according to a third embodiment of the present invention will be explained with reference to FIGS. 8 to 10.

Figure 8:
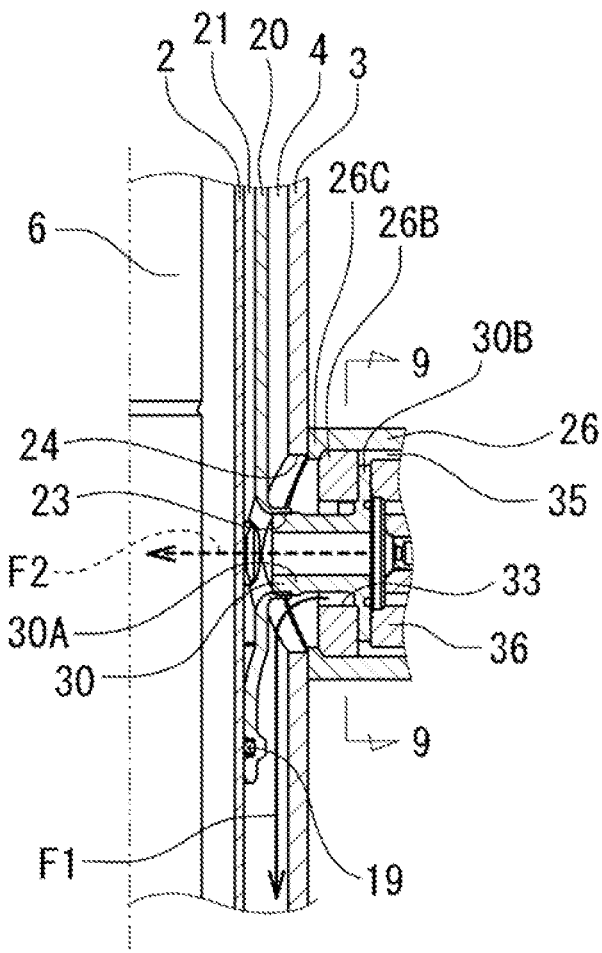
FIG. 8 is a fragmentary vertical sectional view of an important part of a damping force generating mechanism of a shock absorber according to a third embodiment of the present invention.
Figure 9:
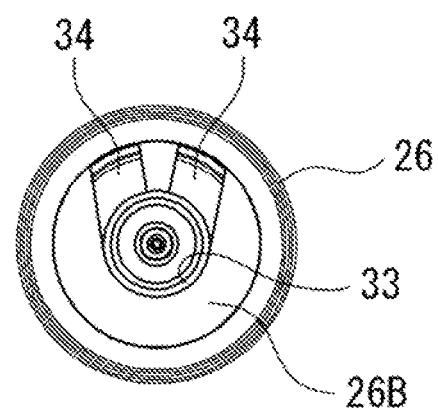
FIG. 9 is a sectional view taken along the line 9-9 in FIG. 8.
Figure 10:
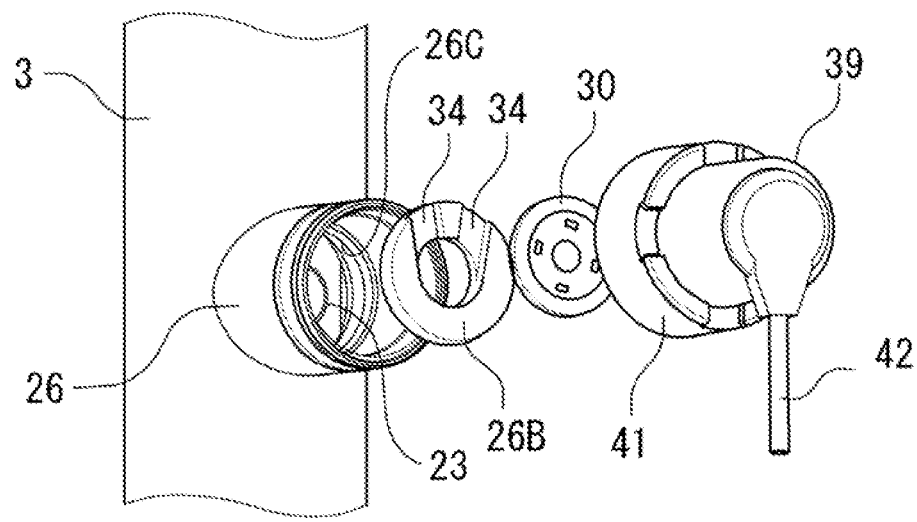
FIG. 10 is an exploded perspective view of the damping force generating mechanism of the shock absorber according to the third embodiment of the present invention.

In the shook absorber according to the third embodiment, as shown in FIGS. 8 to 10, the bottom of the casing 26 is provided in the form of a bottom plate 26B which is a discrete member separate from the casing 26. The bottom plate 26B is formed with a substantially V-shaped passage groove 34. The bottom plats 26B is abutted against an inward flange portion 26C formed at the outer tube 3 side end of the casing 26 and secured, together with the passage member 30, by thread-connecting the solenoid assembly 39 to the opening of the casing 26.

With the above-described structure, the third embodiment offers operational advantages similar to those of the foregoing first embodiment.

Next, a shook absorber according to a fourth embodiment of the present invention will be explained with reference to FIG. 11.

Figure 11:
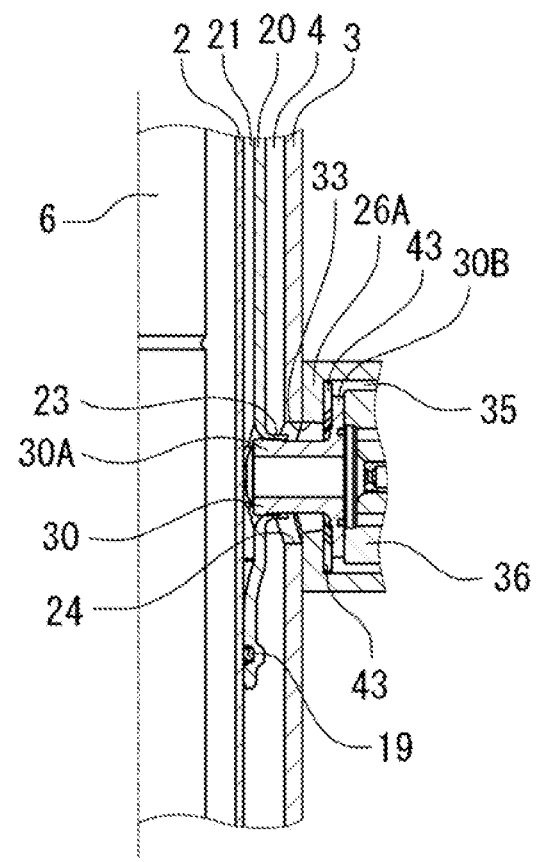
FIG. 11 is a fragmentary vertical sectional view of an important part of a damping force generating mechanism of a shock absorber according to a fourth embodiment of the present invention.

As shown in FIG. 11, the shock absorber according to the fourth embodiment has no substantially V-shaped passage groove 34 formed on the bottom 26A of the casing 26. Instead, equally spaced radial grooves 43 are formed on the bottom 26A of the casing 26. The grooves 43 form flow paths between the grooves 43 and the flange portion 30B of the passage member 30 to provide communication between the chamber 35 in the casing 26 and the reservoir 4. It should, however, be noted that the flow paths do not offer a rectifying effect as provided by the passage grooves 34 and 34A.

In the fourth embodiment, the installation position of the casing 26 with respect to the outer tube 3 is offset upward. Accordingly, the branch pipe 23 of the separator cube 20 and the cylindrical portion 30A of the passage member 30 are decentered upward relative to the opening 24 of the outer tube 3. Consequently, the flow path formed between the branch pipe 23 and the passage member 30, on the one hand, and, on the other, the opening 24 in the outer tube 3 is such that a lower flow path area formed between the opening 24 and the respective lower sides of the branch pipe 23 and the passage member 30 is larger than an upper flow path area formed between the opening 24 and the respective upper sides of the branch pipe 23 and the passage member 30.

With the above-described structure, the hydraulic oil flowing from the chamber 35 in the casing 26 toward the reservoir 4 passes through the flow path between the branch pipe 23 and the passage member 30, on the one hand, and, on the other, the opening 24 in the outer tube 3, to flow into the reservoir 4. When flowing through the flow path, the hydraulic oil is rectified toward the lower side of the branch pipe 23 and the passage member 30, at which the flow path area is larger than at the upper side thereof. The hydraulic oil thus rectified downward is supplied to the base valve 10. Accordingly, it is possible to suppress a sharp reduction in pressure in the lower part of the reservoir 4. It is also possible to suppress the turbulence of the surface of hydraulic oil in the reservoir 4 and the occurrence of a gas phase. As a result, the fourth embodiment can suppress the occurrence of aeration and cavitation and hence obtain stable damping force characteristics as in the case of the foregoing first embodiment.

As has been stated above, the occurrence of aeration and cavitation can be suppressed by rectifying the hydraulic oil flowing from the chamber 35 in the casing 26 toward the reservoir 4 so that the hydraulic oil flows downward, to thereby suppress the occurrence of a gas phase formed by a circumferential flow of hydraulic oil in the reservoir 4. Therefore, the suppression of the occurrence of aeration and cavitation can be expected with any regulating structure capable of suppressing the occurrence of a gas phase by rectifying the hydraulic oil flowing from the chamber 35 in the casing 26 toward the reservoir 4, for example, a through-hole provided in the bottom 26A of the casing 26, in addition to those of the foregoing first to fourth embodiments.

The shock absorber according to the embodiment(s) is capable of suppressing the occurrence of aeration and cavitation without providing a baffle plate in the reservoir and hence exhibiting superior productivity.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2014-074246 filed on Mar. 31, 2014.

The entire disclosure of Japanese Patent Application No. 2014-074246 filed on Mar. 31, 2014 including specification, claims, drawings and summary are incorporated herein by reference in its entirety.

What is claimed is:

1. A shock absorber comprising:
a cylinder having a hydraulic fluid sealed therein;
a piston disposed in the cylinder;
a piston rod connected to the piston and extended to an outside of the cylinder;
an outer tube provided around an outer periphery of the cylinder;
a reservoir formed between the cylinder and the outer tube and having the hydraulic fluid and a gas sealed therein;
a separator tube provided between the cylinder and the outer tube to form a passage between the separator tube and the cylinder, the passage communicating with an interior of the cylinder;
a separator tube opening formed in a side wall of the separator tube;
an opening provided in a side wall of the outer tube to face the separator tube opening;
a casing secured to the side wall of the outer tube such that an interior of the casing communicates with the reservoir through the opening of the outer tube; and
a damping force generating mechanism housed in the casing and connected to the separator tube opening to generate a damping force by controlling a flow of the hydraulic fluid, wherein:
a bottom of the casing has an opening that is connected to the opening of the outer tube;
at least one passage groove is formed on an inner side of the bottom of the casing, the at least one passage groove extending from the vicinity of an inner peripheral surface at an upper side of the casing to the opening; and
a flow of hydraulic fluid flowing from the interior of the casing toward the reservoir is rectified along the passage groove from the upper side of the casing toward the opening, and directed downward in the axial direction of the reservoir to flow into the reservoir,
wherein the at least one passage groove is formed in a V-shape such that the passage groove is forked at an upper end thereof and tapers toward a lower end thereof at which the passage groove communicates with the opening.

2. The shock absorber of claim 1, wherein the passage groove is formed integrally with the bottom of the casing.

3. The reservoir of claim 2, wherein the flow of the hydraulic fluid along the passage groove restricts the hydraulic fluid from flowing upward in the axial direction of the reservoir.

4. The shock absorber of claim 2, wherein the casing is formed of a cylindrical body and the bottom is formed on one end side of the cylindrical body, and the bottom and the cylindrical body are formed of the same element.

5. The shock absorber of claim 2, wherein the casing is formed of a cylindrical body and a bottom plate which is a discrete member that is separate from the cylindrical body; and
the bottom plate is secured in abutment with an inward flange portion formed in the cylindrical body.

6. The reservoir of claim 1, wherein the flow of the hydraulic fluid along the passage groove restricts the hydraulic fluid from flowing upward in the axial direction of the reservoir.

7. The shock absorber of claim 1, wherein the at least one passage groove has, in addition to the V-shaped passage groove, another passage groove formed in an inverted V-shape such that the passage groove is forked at a lower end thereof and tapers toward an upper end thereof at which the passage groove communicates with the opening.

8. The shock absorber of claim 1, wherein the casing is formed of a cylindrical body and the bottom formed on one end side of the cylindrical body, the bottom being made of the same material as the cylindrical body.

9. The shock absorber of claim 1, wherein the casing is formed of a cylindrical body and a bottom plate which is a discrete member that is separate from the cylindrical body; and
the bottom plate is secured in abutment with an inward flange portion formed in the cylindrical body.

10. The shock absorber of claim 1, wherein the casing is formed of a cylindrical body and a bottom plate which is a discrete member that is separate from the cylindrical body;
the bottom plate is secured in abutment with an inward flange portion formed in the cylindrical body; and
the V-shaped passage groove is formed in the bottom plate.

11. The shock absorber of claim 1, wherein the casing is provided with a passage member connecting the separator tube opening and the damping force generating mechanism; and a chamber in the casing and the reservoir communicate with each other through a gap, the gap being defined between the passage member and the opening of the outer tube and between the passage member and the opening.

12. The shock absorber of claim 11, wherein the passage member comprises a flange portion secured by being clamped between the bottom of the casing and the damping force generating mechanism; and the passage groove extends radially outward of the casing beyond the flange portion to provide communication between the chamber in the casing and the opening.

13. A shock absorber comprising:

a cylinder having a hydraulic fluid sealed therein;

a piston disposed in the cylinder;

a piston rod connected to the piston and extending outside of the cylinder;

an outer tube provided around an outer periphery of the cylinder;

a reservoir formed between the cylinder and the outer tube and having the hydraulic fluid and a gas sealed therein;

a separator tube provided between the cylinder and the outer tube to form a passage between the separator tube and the cylinder, the passage communicating with an interior of the cylinder;

a separator tube opening formed in a side wall of the separator tube;

an opening provided in a side wall of the outer tube to face the separator tube opening;

a casing secured to the side wall of the outer tube such that an interior of the casing communicates with the reservoir through the opening of the outer tube; and a damping force generating mechanism housed in the casing and connected to the separator tube opening to generate a damping force by controlling a flow of the hydraulic fluid, wherein:

the casing has a passage member connecting the separator tube opening and the damping force generating mechanism;

a first flow path communicating between a chamber in the casing and the reservoir is formed between the passage member and the opening of the outer tube;

the passage member of the casing is secured to be offset upward relative to the opening of the outer tube; and a lower flow path area of the first flow path formed between the opening of the outer tube and a lower side of the passage member is larger than an upper flow path area of the first flow path formed between the opening of the outer tube and an upper side of the passage member.

14. The shock absorber of claim 13, wherein:

the passage member has a flange portion secured by being clamped between the bottom of the casing and the damping force generating mechanism;

equally spaced radial grooves are formed in the bottom of the casing; and the grooves form a second flow path between the grooves and the flange portion to provide communication between the chamber in the casing and the reservoir through the first flow path.

* * * * *